US011820336B2

(12) United States Patent
Poton et al.

(10) Patent No.: US 11,820,336 B2
(45) Date of Patent: Nov. 21, 2023

(54) ADAPTER FOR MOTOR VEHICLE WIPER BLADE MOUNT

(71) Applicant: Valeo Systemes d'Essuyage, La Verriere (FR)

(72) Inventors: Eric Poton, La Verriere (FR); Vincent Gaucher, La Verriere (FR); Stephane Houssat, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 17/311,594

(22) PCT Filed: Dec. 13, 2019

(86) PCT No.: PCT/EP2019/085115
§ 371 (c)(1),
(2) Date: Jun. 7, 2021

(87) PCT Pub. No.: WO2020/136023
PCT Pub. Date: Jul. 2, 2020

(65) Prior Publication Data
US 2022/0024417 A1  Jan. 27, 2022

(30) Foreign Application Priority Data

Dec. 27, 2018 (FR) ........................ 1874272

(51) Int. Cl.
*B60S 1/38* (2006.01)
*B60S 1/40* (2006.01)

(52) U.S. Cl.
CPC ............... *B60S 1/3801* (2013.01); *B60S 1/40* (2013.01); *B60S 1/3851* (2013.01); *B60S 1/3858* (2013.01);
(Continued)

(58) Field of Classification Search
CPC ........ B60S 1/3801; B60S 1/40; B60S 1/3849; B60S 1/3867; B60S 1/3865; B60S 1/3851;
(Continued)

(56) References Cited

U.S. PATENT DOCUMENTS 4,866,812 A * 9/1989 Arai ...................... B60S 1/3801
                                                15/250.32
5,383,248 A * 1/1995 Ho ........................ B60S 1/3806
                                                15/250.31
(Continued)

FOREIGN PATENT DOCUMENTS

CN     203739843 U     7/2014
CN     204726391 U     10/2015
(Continued)

OTHER PUBLICATIONS

European Patent Office, International Search Report of International Application No. PCT/EP2019/085115, dated Dec. 13, 2019, including English translation.

*Primary Examiner* — Gary K. Graham
(74) *Attorney, Agent, or Firm* — Valeo Systemes d'Essuyage

(57) ABSTRACT

The invention relates to an adapter for a wiper blade mount, the adapter comprising a cover configured to accommodate, inside a central opening, a removable attachment system which allows subsequent temporary fastening of said adapter to an articulated wiper blade arm, when said adapter is implemented on a wiper blade. To this end, the removable attachment system comprises one or more mounting members which take the form of U-clips configured to be removably inserted in the central opening and held in this configuration by means of temporary fastening means. The
(Continued)

invention also relates to a wiper blade comprising such an adapter mounted on a wiper blade mount.

12 Claims, 7 Drawing Sheets

(52) U.S. Cl.
CPC ...... *B60S 1/3867* (2013.01); *B60S 2001/3843* (2013.01); *B60S 2001/4093* (2013.01)

(58) Field of Classification Search
CPC ...... B60S 2001/3843; B60S 2001/4093; B60S 1/3858
USPC ............................ 15/250.32, 250.43, 250.44
See application file for complete search history.

(56) References Cited

U.S. PATENT DOCUMENTS

| | | |
|---|---|---|
| 2012/0159733 A1 | 6/2012 | Kwon |
| 2012/0317741 A1 | 12/2012 | Benner et al. |
| 2013/0007975 A1 | 1/2013 | Wu |
| 2014/0068887 A1 | 3/2014 | Lee |
| 2014/0082875 A1 | 3/2014 | Peers et al. |
| 2015/0375716 A1 | 12/2015 | An |
| 2017/0036648 A1 | 2/2017 | Ku |

FOREIGN PATENT DOCUMENTS

| | | |
|---|---|---|
| DE | 102009046776 A1 | 5/2011 |
| JP | 2003011789 A | 1/2003 |

\* cited by examiner

ADAPTER FOR MOTOR VEHICLE WIPER BLADE MOUNT

CROSS REFERENCE TO RELATED APPLICATIONS

This is a 371 application (submitted under 35 U.S.C. § 371) of International Application No. PCT/EP2019/085115 (WO2020136023) filed on Dec. 13, 2019, which claims the priority date benefit of French Application No. FR1874272 filed on Dec. 27, 2018, the disclosures of which are hereby incorporated by reference in their entirety.

TECHNICAL FIELD

The present invention relates to the field of wiper blades for a motor vehicle window, and more particularly to adapters for fastening a wiper blade mount to a wiper arm.

BACKGROUND

In the field of motor vehicles, wiper systems are known that make it possible to wipe a glazed panel of a motor vehicle. Generally, such wiper systems comprise one or more wiper blades that are articulated so that they can be moved against the glazed panel. Each wiper blade comprises a wiper rubber suitable for being placed in contact with the glazed panel so that it can remove the water from the glazed panel, and an articulated arm that makes it possible to keep the wiper rubber in contact with the glazed panel and to generate a pendulum movement against the glazed panel.

More particularly, the wiper rubber is held by a mount that is attached to the articulated arm. In order to facilitate maintenance operations, the mount is removably fastened to the articulated arm by means of an adapter rigidly connected to the mount and configured so that it is connected to the articulated arm by means of at least one pivot connection.

Of course, there is a multitude of existing adapters, depending on the motor vehicle in question, the shapes and dimensions of the different mounts and their wiper rubbers, as well as on the types of articulated arm to which the mounts are intended to be connected. This wide variety of mounts and articulated arms thus leads to the design of a great many different adapters so that each mount can be fitted to the different types of articulated arm, resulting in increased production costs due to the multiple runs of different parts to be manufactured. In addition, this situation makes the replacement market more complex for occasional repairers, as both a wiper blade mount and the adapter corresponding to the articulated arm installed on the motor vehicle must be purchased.

There is thus a need for simplification and rationalization of the devices allowing the replacement of the wiper rubbers on a motor vehicle.

The object of the present invention is to overcome at least a large number of the problems set out above and also to result in other advantages by proposing a novel adapter for fastening a wiper blade mount to an articulated wiper blade arm.

Another aim of the present invention is to facilitate the connection of such an adapter to several types of articulated wiper blade arm.

A further aim of the present invention is to reduce the manufacturing costs of such an adapter.

SUMMARY

To According to a first aspect of the invention, at least one of the aforementioned aims is achieved with an adapter for fastening a wiper blade mount to an articulated wiper blade arm, the adapter comprising (i) a cover configured to be removably fastened to a main cross-bar of the wiper blade mount, and (ii) a removable attachment system for removably attaching the articulated wiper blade arm to the adapter, the removable attachment system comprising temporary fastening means for temporarily fastening said removable attachment system to the cover.

Thus the removable attachment system of the adapter may be removably attached to the cover. This advantageous configuration makes it possible, using a single type of cover, to provide several removable attachment systems corresponding to several configurations for fastening the articulated arm of the wiper blade to the cover. To be specific, all that is required is to replace a first type of removable attachment system compatible with a first type of articulated arm with a second type of removable attachment system compatible with a second type of articulated arm, without having to change the cover of the adapter according to the first aspect of the invention. More particularly, the first type of removable attachment system can easily be detached from the cover of the adapter according to the first aspect of the invention, by decoupling the temporary fastening means of said first type of removable attachment system. This makes it possible to make the adapter compatible with several types of articulated arm, allowing a wiper blade to be coupled with a greater number of articulated arms.

The adapter according to the first aspect of the invention thus makes it possible to rationalize the replacement of the wiper blades, by increasing the complementarity of the corresponding adapter.

The invention according to the first aspect of the invention is more particularly intended for the replacement market for wiper systems and/or wiper blades and/or adapters for such wiper blades. By making it possible, using the same adapter cover, to provide a plurality of types of removable attachment system for removably attaching the articulated wiper blade arm to said adapter, it is thus easier to connect one same wiper blade comprising such an adapter according to the first aspect of the invention to several types of articulated wiper blade arm.

As a result, it is possible to manufacture a greater number of units of the cover forming the adapter according to the first aspect of the invention, thereby making it possible to reduce the manufacturing costs simply by factors of scale.

In the context of the invention, the following adjectives are defined relative to the cover of the adapter according to the first aspect of the invention:

- the adjective "longitudinal" refers to a direction of extension of the cover along its greatest length. When the adapter is assembled on a wiper blade, the longitudinal direction refers to the axis formed by the wiper rubber. By extension, the longitudinal direction refers to a direction which is parallel or substantially parallel to the greatest length of the wiper blade;
- the adjective "transverse" or "lateral" refers to a direction extending perpendicular to the longitudinal direction, and more particularly a direction perpendicular to two longitudinally extending lateral sides of the cover. When the adapter is coupled to a wiper blade mount, a longitudinal axis and a transverse axis of the cover together form a plane parallel to a bearing surface of the cover on the wiper blade mount;
- the adjective "vertical" refers to a direction that is simultaneously perpendicular to the longitudinal direction and the transverse direction. By way of example, a vertical direction refers in particular to the relative position of the cross-bar of a wiper blade mount in relation to the cover of the adapter according to the first aspect of the invention. By extension, the adjectives "above" and "below" refer to a relative position along the vertical axis.

The adapter according to the first aspect of the invention may advantageously comprise at least one of the following refinements, and the technical features forming these refinements may be considered individually or in combination:

the cover comprises a central opening delimited laterally by two lateral sides, the removable attachment system comprising at least one mounting member which extends transversely through the central opening between the two lateral sides of the cover, each mounting member comprising the temporary fastening means for temporary fastening to the cover. This advantageous configuration thus makes it possible to cleverly house the removable attachment system in the central opening in order to limit the footprint of the cover. In addition, the central opening makes it possible, depending on the different types of coupling between the adapter and the articulated arm, to house a plurality of different types of removable attachment system and/or a variable number of mounting members forming such removable attachment systems. Advantageously, the removable attachment system of the adapter according to the first aspect of the invention comprises a single mounting member—in order to simplify its design and its implementation—or two mounting members—in order to hold the adapter more firmly on the articulated arm. In the case where the removable attachment system comprises two mounting members, the mounting members are preferably distributed along a longitudinal axis in the central opening of the cover;

the removable attachment system is configured to be assembled without play in the cover of the adapter according to the first aspect of the invention. In particular, each mounting member is configured to be inserted without lateral play between the lateral sides of the cover, on either side of the central opening. This play-free fitting of the removable attachment system in the cover allows said removable attachment system to be immobilized in said cover;

the at least one mounting member comprises a pivot connection rod which extends transversely through the central opening between the two lateral sides of the cover, the pivot connection rod being delimited laterally by two lateral flanks. This advantageous configuration thus makes it possible to couple the adapter to the articulated arm about a pivot connection that in turn makes it possible to improve the pressing of the wiper blade against the glazed panel of the motor vehicle;

the pivot connection rod comprises a cylindrical surface which extends transversely between the two lateral sides of the cover;

according to a first alternative, the cylindrical surface of the pivot connection rod comprises at least one flat portion which extends at least partially between the lateral sides of the cover. According to a second alternative, the cylindrical surface of the pivot connection rod comprises two flat portions which extend at least partially between the lateral sides of the cover, the flat portions preferably being diametrically opposite one another, relative to the pivot connection rod. These two alternatives each make it possible to couple the articulated arm intended to interact with the adapter according to the first aspect of the invention in accordance with a predefined configuration of the corresponding mounting member. These advantageous configurations also make it possible to reduce or even prevent relative sliding of one end of the articulated arm interacting with the cylindrical surface of the pivot connection of the adapter according to the first aspect of the invention;

in order to couple the articulated arm to the mounting member forming the removable attachment system of the adapter according to the first aspect of the invention, the cylindrical surface of the pivot connection rod comprises at least one channel which extends at least partially between the lateral sides of the cover. Advantageously, the cylindrical surface of the pivot connection rod comprises a plurality of channels which extend at least partially between the lateral sides of the cover, the channels being angularly distributed regularly around the cylindrical surface, relative to the pivot connection rod;

each mounting member comprises one or two lateral flanks which each extend at a lateral end of the pivot connection rod. In a plane perpendicular to the pivot connection rod of each mounting member, the lateral flank or flanks extend beyond the cylindrical surface such that a terminal end of the lateral flank or flanks is at a non-zero distance from the pivot connection rod. When it includes only a single lateral flank located at one of its lateral ends, the mounting member thus has an L-shaped profile; when the mounting member comprises two lateral flanks each located at a different lateral end of the pivot connection rod, then the mounting member has a U-shaped profile. These different configurations make it possible to facilitate assembly of the mounting member with the cover, by increasing the facing surfaces between, on the one hand, the lateral flank or flanks of the mounting member or members forming the removable attachment system and, on the other hand, the lateral sides of the cover. These configurations advantageously make it possible to improve a mechanical coupling between the removable attachment system thus formed and the cover of the adapter according to the first aspect of the invention;

the temporary fastening means of each mounting member are configured to allow assembly by engagement of complementary shapes between at least one of the lateral flanks of the mounting member and the lateral sides of the cover. This advantageous configuration allows for a simple and quick coupling to be implemented by the user, thus facilitating the interchangeability of the removable attachment system on the cover of the adapter according to the first aspect of the invention;

for this purpose, at least one of the lateral sides of the cover—and preferably both—comprises a groove formed on one face of the lateral side or sides located on the side of the central opening, the groove extending from a lower edge toward an upper edge and/or from the upper edge toward the lower edge. In other words, the groove is formed on the face of one or both lateral sides delimiting the central opening in the cover, facing the central opening. This configuration advantageously makes it possible to predefine the position of the removable attachment system when the latter is mounted in the central opening in the cover. In addition, the groove or grooves allow easy insertion of the removable attachment system in the cover. In the case where each lateral side of the cover includes a groove, then advantageously the two grooves are aligned longitudinally with one another and relative to the central opening. By way of example, this configuration advantageously makes it possible to predetermine a direction of mounting of the corresponding pivot connection rod perpendicular to the longitudinal axis of the cover;

the groove or grooves formed in the lateral side or sides of the cover are preferably straight and oriented vertically;

according to a particular alternative embodiment, the groove or grooves formed on the lateral side or sides of the cover extend from the lower edge of the corresponding lateral face of the cover and toward the upper edge, the groove or grooves being blocked at an upper end by a rim. This advantageous configuration allows the insertion of the corresponding mounting member from the lower edge of the cover, the mounting member being inserted until it comes into abutment against the rim in order to define a vertical position of the mounting member relative to the cover. In addition, this advantageous configuration makes it possible to immobilize the mounting member in the groove with regard to a vertical upward movement, thus ensuring better retention when the adapter interacts with the articulated arm with which it is intended to interact;

a dimension of the groove considered along a longitudinal axis of the cover is substantially equal to a dimension of a lateral flank of the pivot mounting member considered along the longitudinal axis, so as to allow assembly without lateral play of the mounting member in each opposite groove of the lateral sides of the cover. More generally, a shape and/or a dimension of the groove or grooves is substantially identical—within an assembly tolerance—to a shape and/or a dimension of the lateral flank of the corresponding mounting member in order to allow coupling by engagement of complementary shapes of said lateral flank in the facing groove. Each mounting member is thus configured to allow its insertion in the central opening in the cover, inside a groove or between two grooves laterally facing one another and formed in the lateral sides of the cover;

at least one of the lateral sides of the cover—and preferably both lateral sides—comprises, on a lower edge intended to bear against the main cross-bar, a notch intended to allow the insertion of a support platform of the main cross-bar. This advantageous configuration makes it possible in particular to predefine a relative position of the cover relative to the main cross-bar of the wiper blade mount with which it is intended to interact;

the notch formed on the at least one lateral side of the cover extends toward an upper edge, the notch being located in the extension of the corresponding groove in said corresponding lateral side;

a dimension of the notch, considered along the longitudinal axis of the cover, is equal to or substantially greater than the dimension of the groove considered along the longitudinal axis of the cover. In this case, "substantially greater" means that a dimension of the notch considered along the longitudinal axis of the cover is equal to a dimension of the corresponding groove considered along the same longitudinal axis, plus one or more tenths of a millimeter;

at least one of the mounting members includes a device for securing to the main cross-bar of the wiper blade mount. This advantageous configuration makes it possible to improve the mechanical coupling of the removable attachment system, by mechanically coupling the mounting member or members to the main cross-bar, thus reducing the risk of the corresponding mounting member being pulled out of the cover of the adapter according to the first aspect of the invention;

in particular, the device for securing at least some of the mounting members—and preferably each mounting member—is a type of snap-fastening means configured to snap into a complementary device formed on the main cross-bar of the wiper blade mount;

in order to facilitate assembly of the mounting member forming the removable attachment system of the adapter according to the first aspect of the invention, the securing device is located at a lower end of at least one of the lateral flanks of the mounting member—and preferably of each lateral flank of the mounting member. In the case where the mounting member includes a pivot connection rod, the lower end of the lateral flank of the mounting member is the distal end of the lateral flank relative to the pivot connection rod.

the cover of the adapter according to the first aspect of the invention comprises a first longitudinal locking member for locking the cover on the main cross-bar of the wiper blade mount, the first longitudinal locking member being configured to place the cover in longitudinal abutment against the main cross-bar. This advantageous configuration makes it easier to mount the adapter on the main cross-bar of the wiper blade mount. In addition, it reduces the risk of the cover being pulled off the main cross-bar, by improving the mechanical coupling between them. Advantageously, the first longitudinal locking member takes the form of a rigid tongue which projects from the cover, at a first longitudinal end of said cover, the rigid tongue being configured to interact with a first complementary housing in the main cross-bar.

in addition to the first locking member, the cover of the adapter according to the first aspect of the invention comprises a second longitudinal locking member for locking the cover on the main cross-bar of the wiper blade mount. This advantageous configuration makes it easier to mount the adapter on the main cross-bar of the wiper blade mount. In addition, it reduces the risk of the cover being pulled off the main cross-bar, by improving the mechanical coupling between them. In particular, the second longitudinal locking member is advantageously located at a second longitudinal end of the cover, opposite the first end of the cover, the second longitudinal locking member taking the form of a flexible tongue configured to interact by snap-fastening with a second complementary housing in the main cross-bar. The flexible tongue thus acts as a press button making it possible to snap the second longitudinal locking member into/out of its second complementary housing;

the cover comprises a lateral centering member for centering said cover relative to the main cross-bar of the wiper blade mount, the lateral centering member being configured to laterally center the cover on the main cross-bar. This advantageous configuration makes it easier to put the adapter according to the first aspect of the invention in place on the wiper blade mount; In addition, the lateral centering member reduces the risk of the cover being pulled off the main cross-bar, in particular with regard to lateral forces generated when the wiper blade is used on a motor vehicle;

the lateral centering member of the cover comprises at least one centering tab which projects from a lower edge of the cover and in the extension of at least one lateral side of said cover, each centering tab being configured to interact with a corresponding lateral side of the main cross-bar. Thus, each lateral side of the cover comprises one or more centering tabs collectively making it possible to center the cover laterally on the main cross-bar with which it is intended to interact. In the case where the lateral sides of the cover comprise several centering tabs, then each lateral side preferably comprises an equal number of centering tabs, distributed longitudinally along said lateral sides. According to a first alternative, the centering tab or tabs take the form of prismatic protrusions which extend in the extension of the lateral sides of the cover. In this first alternative, a lateral thickness of the centering tab or tabs, considered in the lateral direction of the cover, is possibly less than a lateral dimension of the corresponding lateral side of said cover. In this case, the centering tab or tabs are preferably located, in the transverse direction of the cover, on the side of the central opening, so that a side wall of the centering tab or tabs is coplanar with a wall on the corresponding lateral side of the cover. According to a second alternative, the centering tab or tabs take the form of anchoring hooks which project below the lateral sides of the cover. In a transverse plane of the cover, the hook or hooks forming the centering tab or tabs have an L-shaped profile. In this second alternative, the centering tabs are optionally located on a platform of the cover which is located longitudinally between a longitudinal end and the central opening in said cover, the platform connecting the two lateral sides of the cover and delimiting a longitudinal extent of the central opening;

advantageously, the cover has a median longitudinal plane with respect to which the cover is symmetrical. In addition or as an alternative to the overall longitudinal symmetry of the cover, the groove or grooves present on each of the lateral sides of the cover are advantageously symmetrical to one another with respect to the median longitudinal plane, and/or the first and/or the second median longitudinal locking member is/are respectively symmetrical with respect to the longitudinal plane, and/or the lateral centering member of the cover is symmetrical with respect to the median longitudinal plane;

the adapter according to the first aspect of the invention or the cover and/or the removable attachment system are made from plastic in order to reduce the manufacturing costs. By way of non-limiting example, the cover of the adapter and/or the removable attachment system are obtained by molding.

According to a second aspect of the invention, a motor vehicle wiper blade is proposed comprising an adapter according to the first aspect of the invention or according to any one of the refinements thereof, and a wiper blade mount, the mount comprising (i) a main cross-bar to which the adapter is removably fastened and (ii) two secondary cross-bars fastened to the main cross-bar and supporting a wiper rubber.

The adapter according to the first aspect of the invention is thus coupled to the mount on the main cross-bar thereof, in order to allow the subsequent coupling of the wiper blade with an articulated wiper system arm. It is thus possible, as explained above, using a single adapter, to choose the removable attachment system that corresponds to the corresponding articulated arm, in order to make the wiper blade compatible with a plurality of wiper systems, at a lower cost.

The wiper blade according to the second aspect of the invention may advantageously comprise at least one of the following refinements, and the technical features forming these refinements may be considered individually or in combination:

the main cross-bar comprises (i) a central recess delimited laterally by two lateral edges, the central recess in the main cross-bar being located in line with the central opening in the cover, and (ii) a platform which extends transversely through the central recess and between the two lateral edges, the platform being located in line with the removable attachment system of the adapter, so that the removable attachment system bears against the platform. More particularly, the lower edge of the at least one lateral flank of each mounting member forming the removable attachment system of the adapter according to the first aspect of the invention bears against the platform of the main cross-bar of the wiper blade mount according to the second aspect of the invention;

a dimension of the platform, considered in the longitudinal direction of the cover, is greater than or equal to a dimension of the mounting member or members, considered at their lateral flanks. This advantageous configuration makes it easier for the mounting member or members forming the removable attachment system of the adapter according to the first aspect of the invention to bear against the platform of the main cross-bar of the wiper blade mount according to the second aspect of the invention;

in the case where the cover of the adapter according to the first aspect of the invention comprises a notch formed in its lateral sides, the platform of the main cross-bar is configured to engage in the notch formed in the lateral sides of the cover. In other words, a longitudinal position of the platform of the main cross-bar with respect to a longitudinal position of the notches formed in the lateral sides of the cover and/or a dimension of the platform—in particular at its lateral ends—are such that they allow the platform to fit—preferably with a longitudinal and/or vertical play of a few tenths of a millimeter—into the notches when the cover is mounted on the main cross-bar. As mentioned above, this advantageous configuration makes it possible to predetermine a relative position of the cover with respect to the main cross-bar. In addition, this advantageous configuration also makes it possible to prevent errors so that the cover is only mounted in one possible configuration on the main cross-bar;

the main cross-bar comprises, at a first longitudinal end of the central recess, a first housing configured to interact with the first longitudinal locking member of the cover. In particular, the first housing in the main cross-bar is configured to accommodate the rigid tongue of the cover. As mentioned above, this configuration advantageously makes it possible to longitudinally and/or vertically immobilize the cover of the adapter according to the first aspect of the invention with respect to the main cross-bar of the wiper blade mount;

the main cross-bar comprises, at a second longitudinal end of the central recess opposite the first end, a second housing configured to interact with the second longitudinal locking member of the cover. In particular, the second housing in the main cross-bar is configured to interact by snap-fastening with the flexible tongue of the cover. As mentioned above, this configuration advantageously makes it possible to longitudinally and/or vertically immobilize the cover of the adapter according to the first aspect of the invention with respect to the main cross-bar of the wiper blade mount;

according to a first alternative, the main cross-bar of the wiper blade mount is made of metal. According to a second alternative, the main cross-bar of the wiper blade mount is made of plastic;

in one or other of the alternatives mentioned above, the secondary cross-bars are advantageously made of plastic in order to reduce their weight and/or their manufacturing cost.

According to a third aspect of the invention, a wiper system is proposed comprising at least one articulated arm detachably fastened to the adapter of the wiper blade according to the second aspect of the invention or according to any one of the refinements thereof, each articulated arm being rotatable about an axis of rotation and according to a movement controlled by a motor.

More particularly, each articulated arm is connected to the adapter of the wiper blade by means of the removable attachment system of said adapter, said removable attachment system preferably forming one or more pivot connection rods as described above. This advantageous configuration thus makes it possible to improve the contact of the wiper rubber on the glazed panel when the wiper system is implemented on a motor vehicle, for example. In addition, it is thus possible to detach the wiper blade easily and, by adapting the removable attachment system, to make a single wiper blade compatible with a plurality of different articulated arms: by simply modifying the type of mounting member, it is possible to couple the adapter and the articulated arm.

Varying embodiments of the invention are foreseeable, these incorporating the various optional features explained here in all of their possible combinations.

BRIEF DESCRIPTION OF THE DRAWINGS

In Further features and advantages of the invention will become apparent from the following description and from several exemplary embodiments given as non-limiting examples with reference to the attached schematic drawings, in which.

Figure 1A:
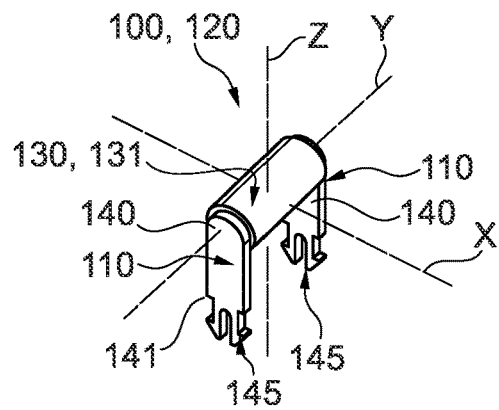
FIGS. 1A to 1E show perspective views of several exemplary embodiments of a removable attachment system for removably attaching an articulated wiper blade arm to an adapter according to the first aspect of the invention.

Of course, the features, alternatives and different embodiments of the invention can be combined with one another, in various combinations, provided that they are not incompatible or mutually exclusive. In particular, alternatives of the invention can be envisaged that comprise only a selection of the features described below in isolation from the other features described, if this selection of features is sufficient to provide a technical advantage or to distinguish the invention from the prior art.

In particular, all of the alternatives and all of the embodiments described can be combined with each other if there is no technical reason preventing this combination.

In the figures, elements common to a number of figures keep the same reference.

DETAILED DESCRIPTION

In the following description of the figures, the adjective "longitudinal" refers to the X axis and corresponds to a direction of extension of the cover along its greatest length. Hereinafter, the adjectives "front" and "rear" respectively refer to the left-hand and right-hand sides of the figures shown. The adjective "transverse" or "lateral" refers to the Y axis and corresponds to a direction extending perpendicularly to the longitudinal direction, and the adjective "vertical" refers to the Z axis and corresponds to a direction that is simultaneously perpendicular to the longitudinal direction and the transverse direction. The adjectives "lower" and "upper" refer respectively to the lower and upper edges of the figures shown.

According to the first aspect of the invention, the invention relates to an adapter 300 for fastening a wiper blade 500 mount 400 to an articulated wiper blade arm. Such an adapter 300 will be described in more detail with reference to FIGS. 5 and 6. The adapter 300 according to the first aspect of the invention comprises a cover 200 configured to be removably fastened to a main cross-bar 410 of the wiper blade mount 400, and a removable attachment system 100 for removably attaching the articulated arm of the wiper blade to the adapter 300. According to the invention, the removable attachment system 100 comprises temporary fastening means 110 for temporarily fastening said removable attachment system 100 to the cover 200 of the adapter 300.

In order to facilitate understanding of the invention, several exemplary embodiments of removable attachment systems 100 will first be described with reference to FIGS. 1 and 2; several exemplary embodiments of covers 200 will then be described with reference to FIGS. 3 and 4; and finally several exemplary embodiments of the adapter will be described with reference to FIGS. 5 and 6.

Referring to FIGS. 1 and 2, the removable attachment system 100 advantageously comprises at least one mounting member 120 intended to be mounted in the cover 200 of the adapter 300. By way of non-limiting examples, several alternative embodiments of such a mounting member 120 are shown, each mounting member 120 being compatible with a particular type of articulated wiper blade arm. One advantage of the invention lies precisely in the modularity of the removable attachment system 100 and in the multiplicity of possible shapes of the mounting members 120 intended to be assembled with the cover 200 of the adapter 300.

In general, the mounting members 120 shown in FIGS. 1 and 2 take the form of U-clips intended to extend through a central opening in the cover 200, as will be described with reference to FIGS. 5 and 6. Such mounting members 120 include a pivot connection rod 130 which extends along the transverse axis Y of the adapter 300. The pivot connection rod 130 is intended to interact with one end of the articulated arm of the wiper blade in order to couple the adapter 300 to said articulated arm with a pivot connection—in rotation about the pivot connection rod 130 of the mounting member 120—in order to improve efficiency of the wiper blade.

The pivot connection rod 130 of the mounting member 120 is delimited laterally by two lateral flanks 140 which each extend at a lateral end of the pivot connection rod 130. Each lateral flank takes the form of a flat wall which extends in a plane formed by the longitudinal axis X and the vertical axis Z.

Figure 1C:
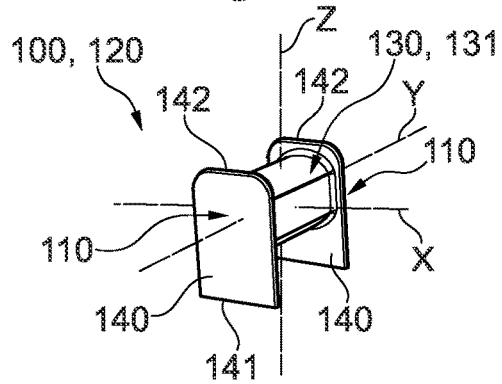
Figure 1B:
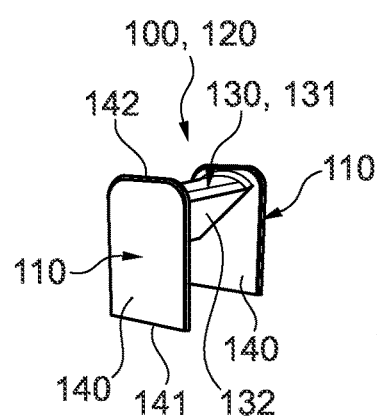
Figure 1D:
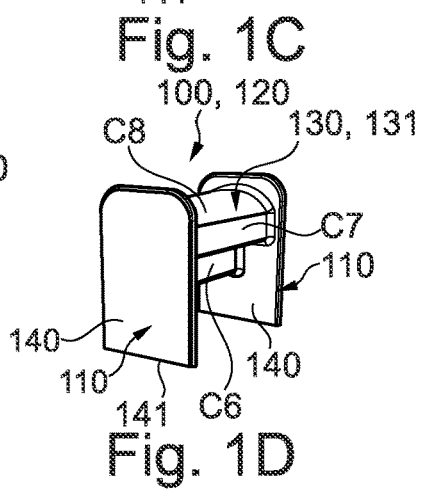
Figure 1E:
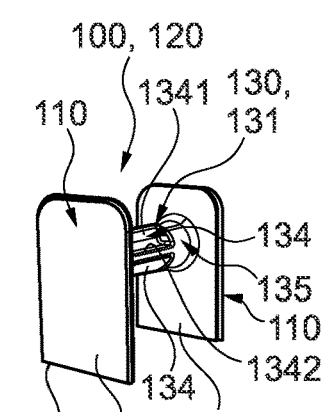
Figure 2A:
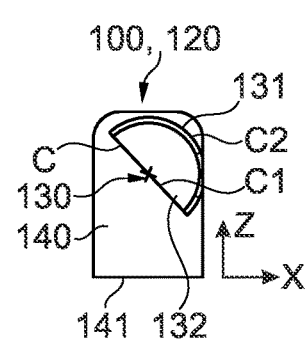
FIGS. 2A to 2D show sectional views along a transverse plane (ZX) of the removable attachment systems shown in FIGS. 1B to 1E, respectively.
Figure 2B:
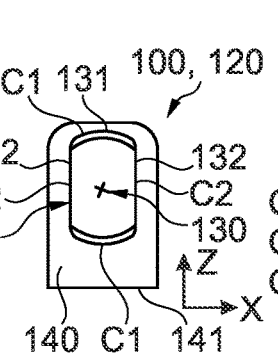
Figures 2C, 2D:
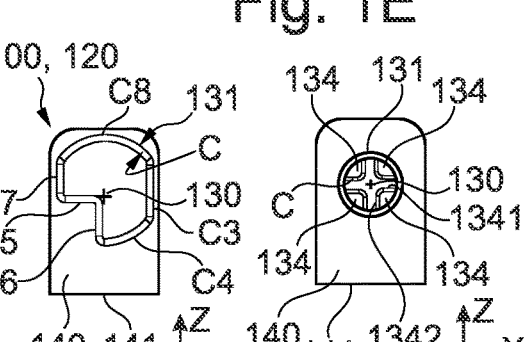

The pivot connection rod 130 is delimited by a cylindrical surface 131 which extends between two lateral ends of the pivot connection rod 130, and more particularly between the two lateral flanks 140 of the mounting member 120. The cylindrical surface 131 is advantageously formed by a plurality of generatrices which are all parallel to one another and which are parallel to the transverse axis Y. As can be seen in FIGS. 1B to 1E and 2A to 2D, the cylindrical surface 131 may take several forms:

FIGS. 1B and 2A show a first alternative embodiment in which the cylindrical surface 131 is formed by a directrix curve C taking the form of a semicircle. In other words, the directrix curve C is formed by a circular portion C1 taking the form of an arc of a circle, each end of which is connected by a linear portion C2 of the directrix curve, the linear portion C2 being a diameter of the arc of a circle formed by the circular portion C1 of the directrix curve C, relative to the pivot connection rod 130 shown in FIG. 2A. As a result, the cylindrical surface 131 of the pivot connection rod 130 comprises a flat portion 132 making it possible to improve the coupling between the mounting member 120 and the articulated arm of the wiper blade. Thus, in this first alternative embodiment, the cylindrical surface 131 extends identically between the two lateral flanks 140 of the mounting member 120;

FIGS. 1C and 2B show a second alternative embodiment in which the cylindrical surface 131 is formed by a directrix curve C comprising two circular portions C1 diametrically opposite and symmetrical to one another with respect to the pivot connection rod 130 shown in FIG. 2B, each circular portion being connected to one another by a linear portion C2 of the directrix curve. The two linear portions are diametrically opposite one another with respect to the pivot connection rod 130 shown in FIG. 2B. As a result, the cylindrical surface 131 of the pivot connection rod 130 comprises two flat portions 132 diametrically opposite one another with respect to the pivot connection rod 130 and making it possible to improve the coupling between the mounting member 120 and the articulated arm of the wiper blade. Thus, in this second alternative embodiment, the cylindrical surface 131 extends identically between the two lateral flanks 140 of the mounting member 120;

FIGS. 1D and 2C show a third alternative embodiment in which the cylindrical surface 131 is formed by a directrix curve C comprising (i) two circular portions C4, C8 diametrically opposite and asymmetrical to one another with respect to the pivot connection rod 130 shown in FIG. 2B, and (ii) a plurality of linear segments C3, C5, C6, C7 forming an asymmetrical shape of the cylindrical surface 130 and making it possible to improve the coupling between the mounting member 120 and the articulated arm of the wiper blade. In particular, the first C5 and second C6 linear segments are perpendicular to one another so as to form a channel on the cylindrical surface 130 of the mounting member 120. This advantageous configuration also makes it possible to obtain an asymmetrical shape which allows only one configuration for assembly of the articulated arm of the wiper blade on the mounting member 120. Thus, in this third alternative embodiment, the cylindrical surface 131 extends identically between the two lateral flanks 140 of the mounting member 120;

FIGS. 1E and 2D show a fourth alternative embodiment in which, in a central portion with respect to the transverse axis Y, the pivot connection rod 130 comprises a plurality of channels 134 delimited by two surfaces 1341, 1342 perpendicular to one another. In other words, in the central portion, a directrix curve C delimiting the cylindrical surface 131 thus formed has a general cross shape, as can be seen in FIG. 2D. In a lateral end portion, the cylindrical surface 131 takes the form of a circular sleeve 135 visible in FIG. 1E. Thus, in this fourth alternative embodiment, the cylindrical surface 131 does not extend identically between the two lateral flanks 140 of the mounting member 120: it comprises a central portion having a first directrix curve C, in the form of a cross, the central portion being flanked by two lateral end parts each having a second directrix curve C which is circular.

The generatrices delimiting the cylindrical surfaces 131 in the various alternative embodiments of the mounting member 120 are advantageously perpendicular to the lateral flanks 140 of said mounting members 120.

Relative to the longitudinal axis X, the lateral flanks have longitudinal dimensions at least equal to a longitudinal dimension of the cylindrical surface 131 forming the pivot connection rod 130. The pivot connection rod 130 is advantageously located in an upper half of the lateral flanks 140, relative to the vertical axis Z.

In the examples shown in FIGS. 1B to 1E, an upper edge 142 of the lateral flanks 140 of the mounting members 120 is advantageously located above the cylindrical surface 131, relative to the axis Z. Conversely, in the example shown in FIG. 1A, an upper edge 142 of the lateral flanks 140 of the mounting member 120 is located at or below the cylindrical surface 131, relative to the axis Z.

In all the exemplary embodiments shown in FIGS. 1 and 2, a lower edge 141—forming a lower terminal end 141—of the lateral flanks 140 of the mounting members 120 is located at a distance from the cylindrical surface 131, lower than the latter. The lower edge 141 of the lateral flanks 140 of the mounting members 120 is advantageously linear in order to facilitate bearing of said mounting members 120 against the main cross-bar 410 of the wiper blade mount 400, as will be described further on below.

In addition, and as can be seen in the alternative embodiment of FIG. 1A, the mounting member 120 may include, at the lower edge 141 of its lateral flanks 140, a securing device 145 for securing said mounting member 120 to the main cross-bar 410 of the wiper blade mount 400, when the corresponding adapter 300 is mounted on said mount 400. In the example shown in FIG. 1A, the securing device 145 takes the form of snap-fastening means configured to snap into a complementary device formed on the main cross-bar 410 of the wiper blade mount 400.

In the context of the invention, and as will be explained in more detail with reference to FIGS. 5 and 6, the lateral flanks 140 of the mounting members 120 form the temporary fastening means 110 for temporarily fastening the removable attachment system 100 to the cover 200 of the adapter 300 according to the first aspect of the invention. In particular, the lateral flanks 140 of the mounting members 120 are configured to allow assembly by engagement of complementary shapes between said lateral flanks 120 and the cover 200 of the adapter 300.

Referring to FIGS. 3 and 4, two exemplary embodiments of covers 200 of the adapter 300 according to the first aspect of the invention will now be described.

The cover 200 takes the form of buttonhole module extending along the longitudinal axis X. The cover 200 has an elongate, narrow shape: it extends longitudinally between a rear end 203 and a front end 204, and it is laterally delimited by two lateral sides 210. Relative to the vertical axis, the cover 200 is delimited by a lower edge 201 and an upper edge 202.

The exemplary embodiments of the cover 200 shown in FIGS. 3 and 4 have a plane of symmetry formed by the longitudinal axis X and the vertical axis Z.

The lower edge 201 of the cover 200 forms a flat lower surface 205 suitable for being pressed against the main cross-bar 410 of the wiper blade mount 400 when the corresponding adapter 300 is coupled to said mount 400. The upper edge 202 of the cover 200 forms a curved surface, required due to aerodynamic considerations and to allow optimum coupling of the articulated wiper blade arm to the adapter 300.

Between its two lateral sides 210, the cover 200 comprises a central opening 230 through which the removable attachment system 100 is intended to be fitted and fastened to said cover 200 temporarily, by means of the temporary fastening means 110. In the examples shown in FIGS. 3 and 4, the central opening 230 has an oblong shape. The central opening 230 is a through-opening: it opens out simultaneously on the upper edge 202 and the lower edge 201 of the cover 200. The central opening 230 in the cover 200 is longitudinally delimited by two curved surfaces forming front and rear flanks 231 and 232 of said central opening 230. Laterally, the central opening 230 in the cover 200 is delimited by inner faces 233 of the lateral sides 210 of the cover 200.

Figure 3A:
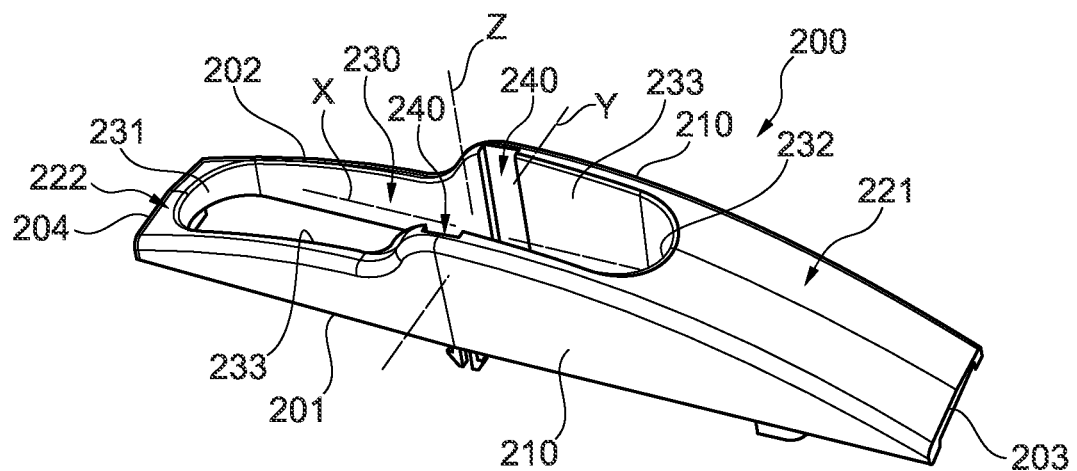
FIGS. 3A and 3B show perspective views from above and below of a first exemplary embodiment of a cover of the adapter according to the first aspect of the invention.
Figure 4A:
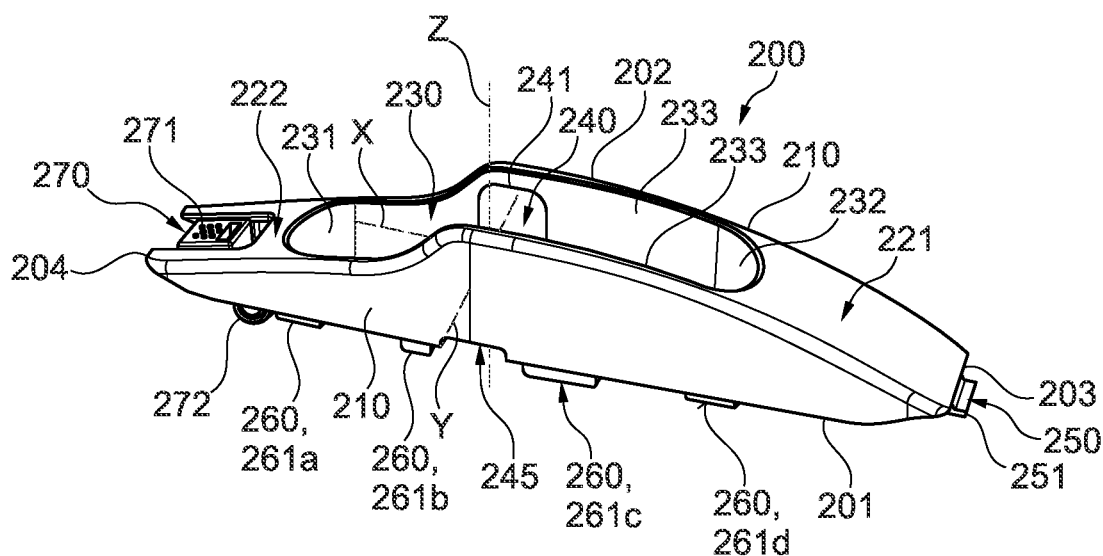
FIGS. 4A and 4B show perspective views from above and below of a second exemplary embodiment of a cover of the adapter according to the first aspect of the invention.

Longitudinally, the cover 200 comprises a front nose 222 and a rear nose 221 which together flank the central opening 230 relative to the longitudinal axis X. In other words, the rear nose 221 is located between the central opening 230 and the rear end 203 of the cover 200; and the front nose 222 is located between the central opening 230 and the front end 204 of the cover 200. As can be seen in FIGS. 3A and 4A respectively, the front and rear noses 222 and 221 of the cover 200 form a solid surface on the upper edge 202 of said cover 200. This advantageous configuration makes it possible to improve the aerodynamic performance of the adapter when it is assembled on the mount 400 of a wiper blade.

In order to interact with the removable attachment system 100, and more specifically with the different types of mounting members 120, the cover 200 of the adapter 300 according to the first aspect of the invention comprises at least one groove 240 formed on at least one of the lateral sides 210 of the cover, on the side of the inner face 233 of said lateral sides 210 and delimiting the central opening 230. Along the transverse axis Y, each groove 240 opens into the central opening 230 in the cover 200.

In the embodiments shown in FIGS. 3 and 4, each lateral side 210 of the cover 200 comprises a single groove 240. Each groove 240 is advantageously located in a longitudinally centered zone of the central opening 230 in the cover 200. In addition, relative to the longitudinal axis X of the cover 200, the openings 240 on each lateral side 210 are located facing one another, a first groove 240 on a first lateral side 210 of the cover 200 being located at the same longitudinal distance as a second groove 240 on a second lateral side 210 of the cover 200, relative to the rear end 203 of the cover 200.

The grooves 240 in the cover 200 located facing one another advantageously have the same dimensions and/or shapes. In particular, in a transverse plane comprising the transverse axis Y and the vertical axis Z, each groove 240 has a U-shaped section, said groove 240 being delimited longitudinally by two linear vertical walls, while the groove 240 is delimited laterally by a flat wall parallel to the inner face 233 of the corresponding lateral side 210 of the cover 200. In other words, in the exemplary embodiments shown in FIGS. 3 and 4, the grooves 240 have a rectangular cross section.

Figure 3B:
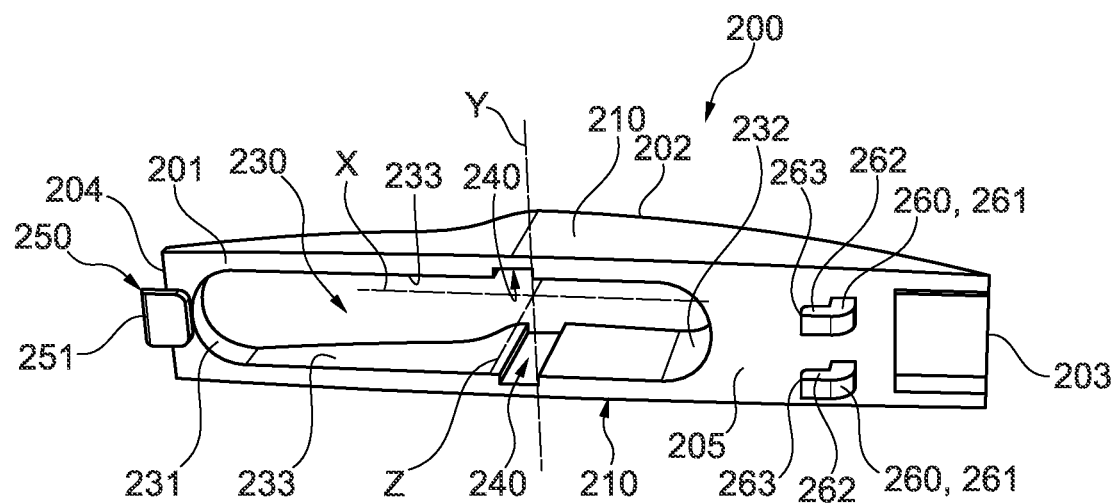

In the example shown in FIGS. 3A and 3B, each groove 240 in the cover 200 extends from the lower edge 201 toward an upper edge 202 of said cover 200, said groove opening out both on said lower edge 201 and on said upper edge 202 of the cover 200. This configuration advantageously makes it possible to insert the corresponding removable attachment system 100 either from the lower edge 201 or from the upper edge 202 of the cover 200.

Figure 4B:
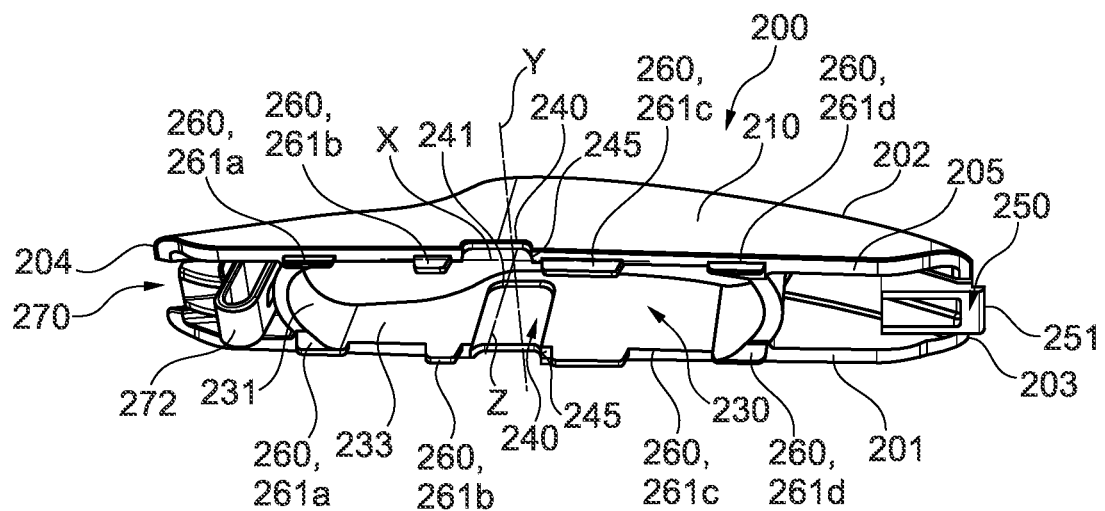

In the example shown in FIGS. 4A and 4B, each groove 240 in the cover 200 extends from the lower edge 201 toward an upper edge 202 of said cover 200. However, unlike the previous embodiment, the grooves 240 do not open out on the upper edge 202 of the cover 200: they are delimited vertically by a rim 241, said rim 241 forming an upper end of said grooves 240. This configuration makes it possible, firstly, to define a single direction of insertion of the removable attachment system 100 in the cover 200, from the lower edge 201 toward the upper edge 202 of the cover 200. Secondly, this configuration allows the removable attachment system 100 to bear vertically against the rim 241 of the groove 240, as will be described in more detail with reference to FIGS. 5 and 6.

In the example shown in FIGS. 4A and 4B, at the lower edge 201 intended to bear against the main cross-bar 410 of the wiper blade mount 400, the two lateral sides 210 of the cover 200 of the adapter 300 according to the first aspect of the invention comprise a notch 245 intended to allow the insertion of a support platform of the main cross-bar 410 in said notch 245, as will be described with reference to FIGS. 8A and 8B. The notch 245 thus formed on the lateral sides 210 of the cover 200 extends toward the upper edge 202 of the cover. The notch 245 is located in the vertical extension of the corresponding groove 240 on the corresponding lateral side 210 of the cover 200. In particular, a dimension of the notch 245, considered along the longitudinal axis X of the cover 200, is slightly greater than a dimension of the corresponding groove 240 considered along the same longitudinal axis X. In the transverse direction Y, each notch 245 is a through-notch and opens out on each side of the corresponding lateral side 210 of the cover 200.

Advantageously, relative to the longitudinal axis X of the cover 200, each notch 245 is located at the same longitudinal distance from the rear end 203 of the cover 200. In other words, the notches 245 on each lateral side 210 of the cover are located facing one another. The notches 245 in the cover 200 located facing one another advantageously have the same dimensions and/or the same shapes.

In order to allow the cover 200 to be coupled to the main cross-bar 410 of the wiper blade mount 400 with which the adapter 300 according to the first aspect of the invention is intended to interact, the cover 200 comprises a first longitudinal locking member 250. The first longitudinal locking member 250 is configured to place the cover 200 in longitudinal abutment against the main cross-bar 410. The interaction between the first longitudinal locking member 250 and the main cross-bar 410 of the wiper blade mount 400 will be described more specifically with reference to FIGS. 7 and 8.

In the exemplary embodiment shown in FIGS. 3A and 3B, the first longitudinal locking member 250 is located at the front end 204 of the cover 200. In the exemplary embodiment shown in FIGS. 4A and 4B, the first longitudinal locking member 250 is located at the rear end 203 of the cover 200.

The first longitudinal locking member 250 takes the form of a rigid tongue configured to interact by engagement of complementary shapes with a first complementary housing formed on the main cross-bar 410 of the wiper blade mount 400, as will be described further on below. In the examples shown in FIGS. 3 and 4, the first longitudinal locking member 250 takes the form of a prismatic protrusion which extends:
- relative to the vertical axis Z, projecting below the lower flat surface 205 of the cover 200;
- relative to the longitudinal axis X, projecting beyond the front 204 or rear 203 end of the cover 200, that is to say in a direction away from said front 204 or rear 203 end with respect to the central opening 230 in the cover 200;
- relative to the transverse axis Y, between the two lateral sides 210 of the cover.

In order to improve the coupling of the cover 200 to the main cross-bar 410 of the wiper blade mount 400 with which the adapter 300 according to the first aspect of the invention is intended to interact, and as seen in FIGS. 4A and 4B, the cover 200 comprises a second longitudinal locking member 270. The second longitudinal locking member 270 is configured to place the cover 200 in longitudinal abutment against the main cross-bar 410. The interaction between the second longitudinal locking member 270 and the main cross-bar 410 of the wiper blade mount 400 will be described more specifically with reference to FIGS. 8A and 8B.

The second longitudinal locking member 270 is located longitudinally opposite the first longitudinal locking member 250. In the exemplary embodiment shown in FIGS. 4A and 4B, the second longitudinal locking member 270 is located at the front end 203 of the cover 200. The second longitudinal locking member 270 takes the form of a flexible tongue configured to interact by snap-fastening with a second complementary housing formed on the main cross-bar 410 of the wiper blade mount 400, as will be described further on below. The second longitudinal locking member 270 comprises a support cap 271 rigidly connected to a U-shaped tongue 272 which extends below the lower flat surface 205 of the cover. The U-shaped tongue 272 is elastically connected to the front nose 231 of the cover 200, by local thinning of material in order to allow a local elastic deformation of the flexible tongue forming the second elastic locking member 270.

In order to facilitate the mounting of the cover 200 on the main cross-bar 410 of the wiper blade mount 400 with which the adapter 300 according to the first aspect of the invention is intended to interact, and in order to improve the mechanical connection between them against lateral pulling forces—generated, for example, when the wiper arm is used on a motor vehicle in motion and subjected to an aerodynamic air flow—the cover 200 comprises a lateral centering member 260 for centering said cover 200 relative to the main cross-bar 410 of the wiper blade mount 400. More particularly, the lateral centering member 260 is configured to laterally center the cover 200 on the main cross-bar 410.

The lateral centering member 260 of the cover 200 comprises at least one centering tab which projects from the lower edge 201 of the cover 200, that is to say below the lower flat surface 205 relative to the vertical axis Z.

According to a first alternative shown in FIGS. 3A and AB, the lateral centering member 260 comprises two centering tabs 261 which take the form of anchoring hooks. Each anchoring hook extends vertically below the lower flat surface 205 of the cover 200. In a transverse plane of the cover 200, the anchoring hooks forming the centering tabs 261 have an L-shaped profile, one end 263 of the longitudinally extending bearing surface 262 of the anchoring hooks being oriented toward the side of the central opening 230 in the cover 200. In this first alternative, the centering tabs 261 are located longitudinally in the region of the rear nose 221 of the cover 200.

According to a second alternative shown in FIGS. 4A and 4B, the lateral centering member 260 comprises a plurality of centering tabs 261a-261d distributed longitudinally and symmetrically with respect to the longitudinal axis below each lateral side 210 of the cover 200. More particularly, the cover 200 comprises two sets of four centering tabs 261a-261d distributed on each lateral side 210 of said cover 200. In this alternative embodiment, each centering tab 261a-261d takes the form of a prismatic protrusion extending below the lower flat surface 205 of the cover 200 along the vertical axis Z, and in the extension of the lateral sides 210 of said cover 200. Longitudinal dimensions of each centering tab 261a-261d vary from one centering tab 261a-261d to another. On the other hand, each centering tab 261a-261d of a first set of centering tabs 261a-261d located on a first lateral side 210 of the cover 200 is identical—in terms of shape and dimensions—to the corresponding centering tab 261a-261d of a second set of centering tabs 261a-261d located on the second lateral side 210 of said cover 200 and facing the corresponding centering tab 261a-261d of said first set.

In this second alternative shown in FIGS. 4A and 4B, a lateral thickness of the centering tabs 261a-261d, considered along the transverse axis Y of the cover 200, is less than a lateral dimension of the corresponding lateral side 210 of said cover 200. More particularly, a lateral thickness of the centering tabs 261a-261d is advantageously equal to half of a lateral thickness of the corresponding lateral side 210 considered at said centering tab 261a-261d. Furthermore, relative to the transverse axis Y, the centering tabs 261a-261d are all located on the side of the central opening 230, so that a side wall of the centering tabs is coplanar with the inner faces 233 of the lateral sides 210 of the cover 200.

In the second alternative embodiment, each centering tab 261a-261d is configured to interact with a corresponding lateral side of the main cross-bar 410 of the wiper blade mount 400 with which the adapter 300 according to the first aspect of the invention is intended to interact.

Figure 5A:
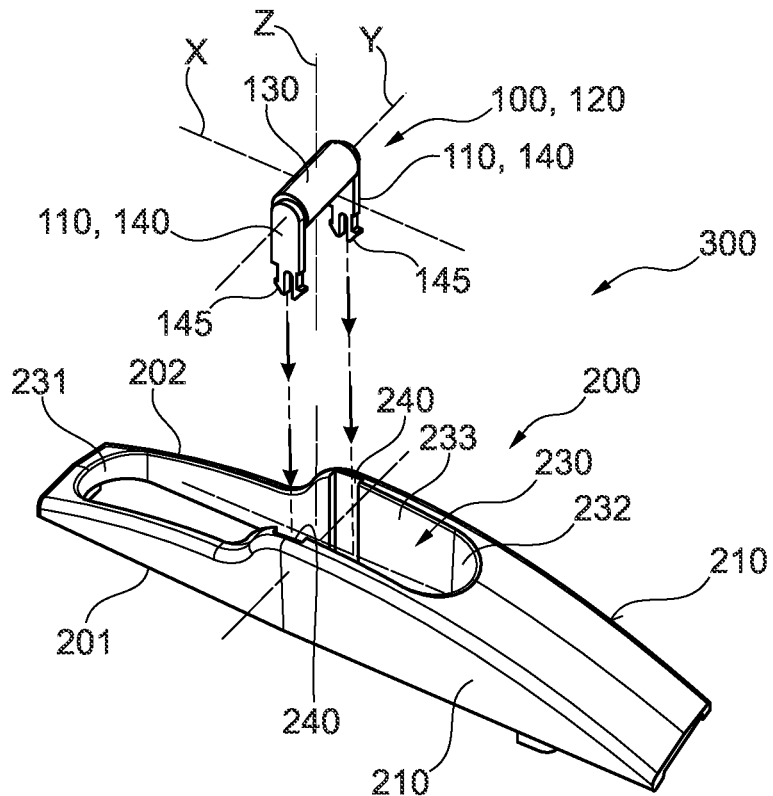
FIGS. 5A and 5B show perspective views of a first exemplary embodiment of the adapter according to the first aspect of the invention, respectively disassembled and assembled, the adapter being obtained by the association of the removable attachment system shown in FIG. 1A and the cover shown in FIGS. 3A and 3B.
Figure 5B:
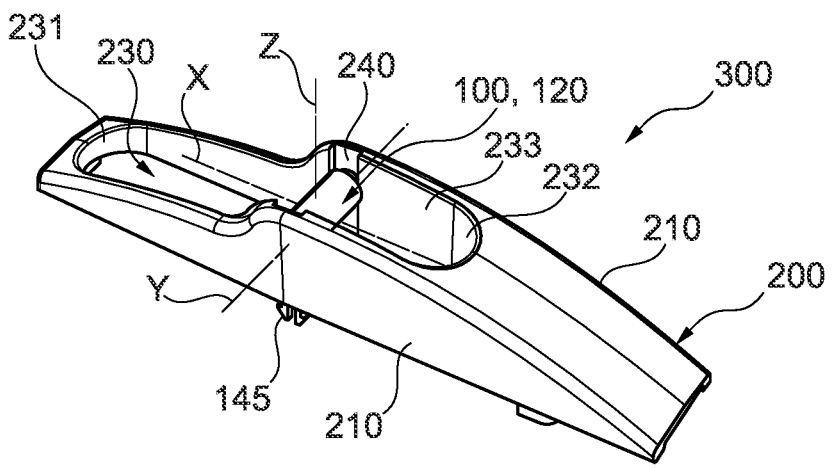
Figure 6A:
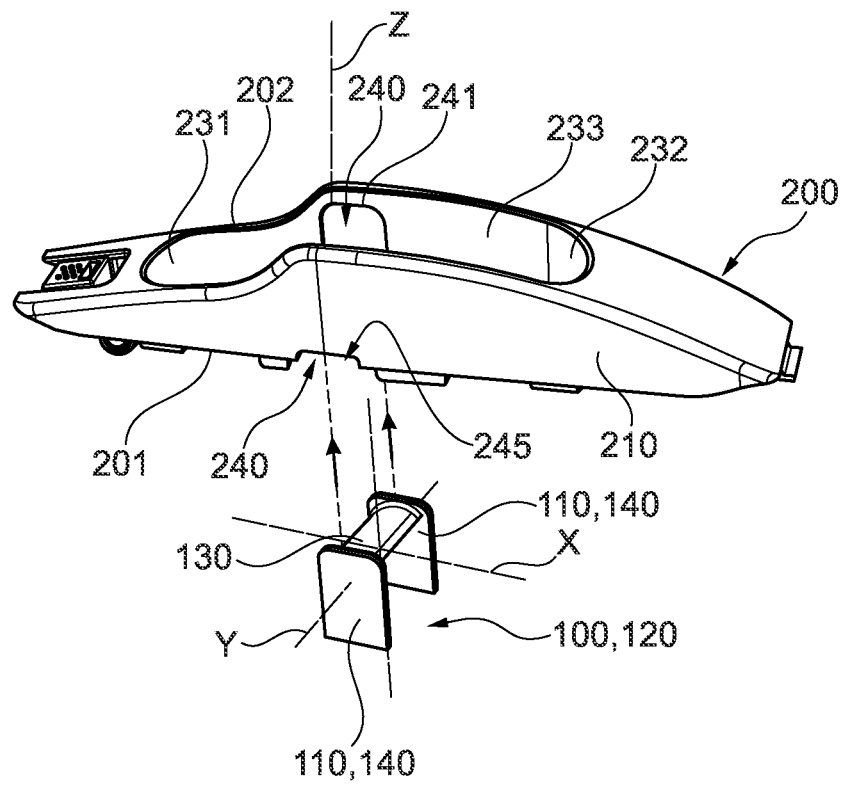
FIGS. 6A and 6B show perspective views of a second exemplary embodiment of the adapter according to the first aspect of the invention, respectively disassembled and assembled, the adapter being obtained by the association of the removable attachment system shown in FIG. 1B and the cover shown in FIGS. 4A and 4B.
Figure 6B:
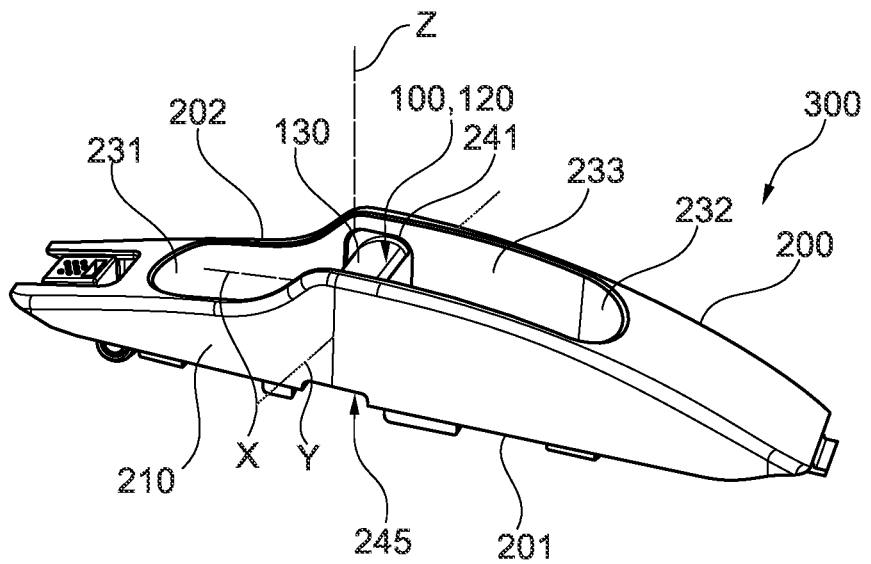

Referring to FIGS. 5 and 6, the removable attachment system 100 as described above is assembled on the cover 200 to form the adapter according to the first aspect of the invention. In particular, FIGS. 5A and 5B show a first exemplary embodiment of the adapter 300 according to the first aspect of the invention obtained by the association of the removable attachment system 100 shown in FIG. 1A and the cover 200 shown in FIGS. 3A and 3B, the adapter 300 being shown in an exploded view and an assembled view, respectively. Similarly, FIGS. 6A and 6B show a second exemplary embodiment of the adapter 300 according to the first aspect of the invention obtained by the association of the removable attachment system 100 shown in FIG. 1B and the cover 200 shown in FIGS. 4A and 4B, the adapter 300 being shown in an exploded view and an assembled view, respectively.

In the exemplary embodiment shown in FIGS. 5A and 5B, the mounting member 120 forming the removable attachment system 100 is inserted in the cover 200, at its central opening 230, by a translational movement along the vertical axis Z from above, as shown in FIG. 5A, or possibly from below. This dual possibility of inserting the mounting member in the corresponding grooves 240 in the cover 200 is permitted because said grooves 240 extend linearly from the lower edge 201 of the cover 200 to its upper edge 202.

In order to facilitate the insertion of the mounting member 120 in the groove 240 in the cover 200, a dimension of the groove 240 considered along the longitudinal axis X is substantially equal to—or even slightly greater than, within the assembly tolerances—a dimension of the corresponding lateral flank 140 of the mounting member 120 considered along the same longitudinal axis X.

Once inserted between the two lateral sides 210 of the cover 200, the mounting member 120 is thus fitted without lateral play: it is held in position by the friction of the lateral flanks 140 of said mounting member 120 against the facing groove 240 in the cover 200. The lateral flanks 140 of the mounting member 120 thus form the temporary fastening means 110 for temporarily fastening said removable attachment system 100 on the cover 200, said temporary fastening means 110 interacting with the facing grooves 240 in the cover 200 to assemble the mounting member 120 by coupling of complementary shapes and preferably without lateral play. This play-free fitting cleverly achieves retention of the mounting member 120 in the central opening 230 of the cover 200, between its lateral sides 210.

As can be seen in FIG. 5B, when the mounting member 120 is assembled on the cover 200, the pivot connection rod 130 is located below the upper edge 202 of the cover 200, considered at the corresponding groove 240. In addition, when the mounting member 120 is assembled on the cover 200, the securing device 145—in this case taking the form of a snap-fastening means—is located below the lower edge 201 of the cover 200.

In the exemplary embodiment shown in FIGS. 6A and 6B, the mounting member 120 forming the removable attachment system 100 is inserted in the cover 200, at its central opening 230, by a translational movement along the vertical Z axis from below, as shown in FIG. 6A. In this case, it is not possible to insert the mounting member 120 in the corresponding grooves 240 in the cover 200 from the top of the cover 200. To be specific, as described above with reference to FIGS. 4A and 4B, the grooves 240 in the cover 200 extend linearly from the lower edge 201 of the cover 200 and are delimited by the rim 241 forming the upper end of said grooves 240.

In a manner comparable to the exemplary embodiment shown in FIG. 5, and in order to facilitate the insertion of the mounting member 120 in the groove 240 in the cover 200, a dimension of the groove 240 considered along the longitudinal axis X is substantially equal to—or even slightly greater than, within the assembly tolerances—a dimension of the corresponding lateral flank 140 of the mounting member 120 considered along the same longitudinal axis X.

Once inserted between the two lateral sides 210 of the cover 200, the mounting member 120 is thus fitted without lateral play: it is held in position by the friction of the lateral flanks 140 of said mounting member 120 against the facing groove 240 in the cover 200. The lateral flanks 140 of the mounting member 120 thus form the temporary fastening means 110 for temporarily fastening said removable attachment system 100 on the cover 200, said temporary fastening means 110 interacting with the facing grooves 240 in the cover 200 to assemble the mounting member 120 by coupling of complementary shapes and preferably without lateral play. This play-free fitting cleverly achieves retention of the mounting member 120 in the central opening 230 of the cover 200, between its lateral sides 210.

In addition, an upper edge of the lateral flanks 140 of the mounting member 120 bears against the rim 241 of the grooves 240 in the cover 200. This advantageous configuration makes it possible to place the mounting member 120 in vertical upward abutment relative to the cover 200, thus improving the reliability of the mechanical assembly of the removable attachment system 100 in the cover 200 of the adapter 300 according to the first aspect of the invention.

As can be seen in FIG. 6B, when the mounting member 120 is assembled on the cover 200, the pivot connection rod 130 is located below the upper edge 202 of the cover 200, considered at the corresponding groove 240. Furthermore, when the mounting member 120 is assembled on the cover 200, a lower edge of the lateral flanks 140 of the mounting member 120 is located above the notches 245 formed in the lateral sides 210 of the cover 200.

Figure 7A:
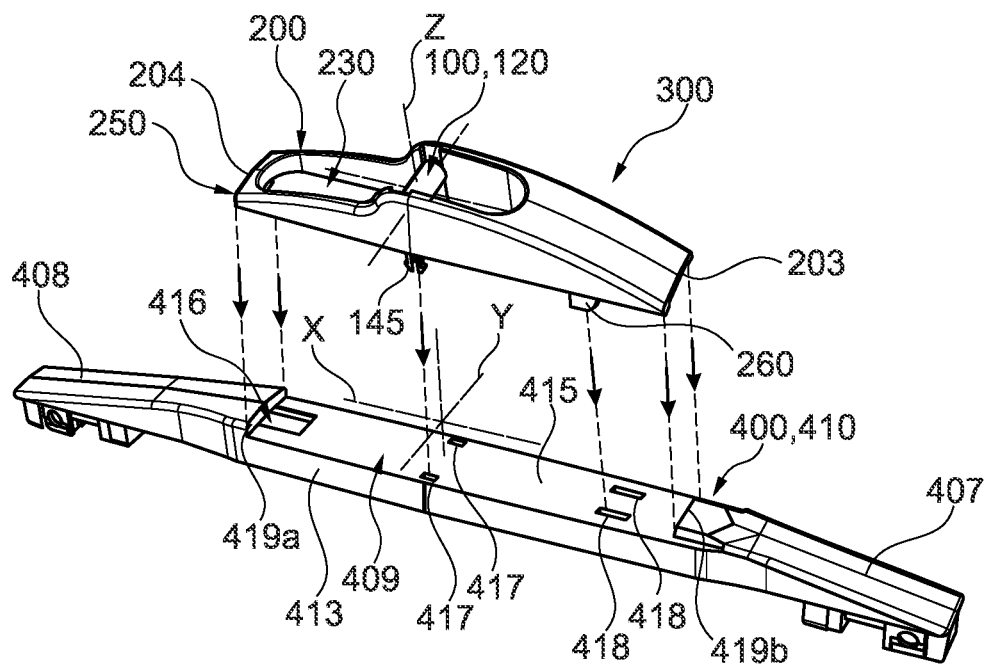
FIGS. 7A and 7B show perspective views of a first exemplary embodiment of a wiper blade according to the second aspect of the invention, respectively disassembled and assembled, the wiper blade being obtained by the association of the adapter shown in FIGS. 5A and 5B with a wiper blade mount, the wiper rubber not being shown.
Figure 7B:
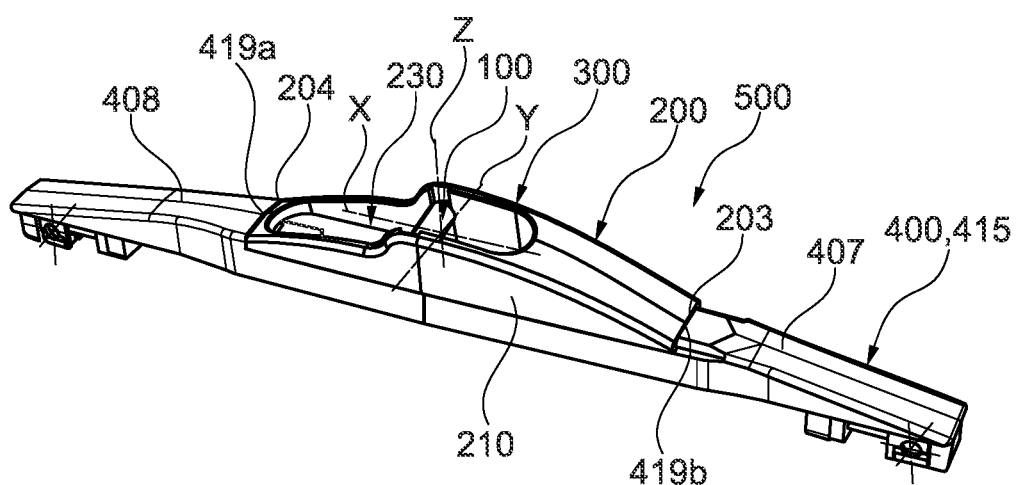
Figure 8A:
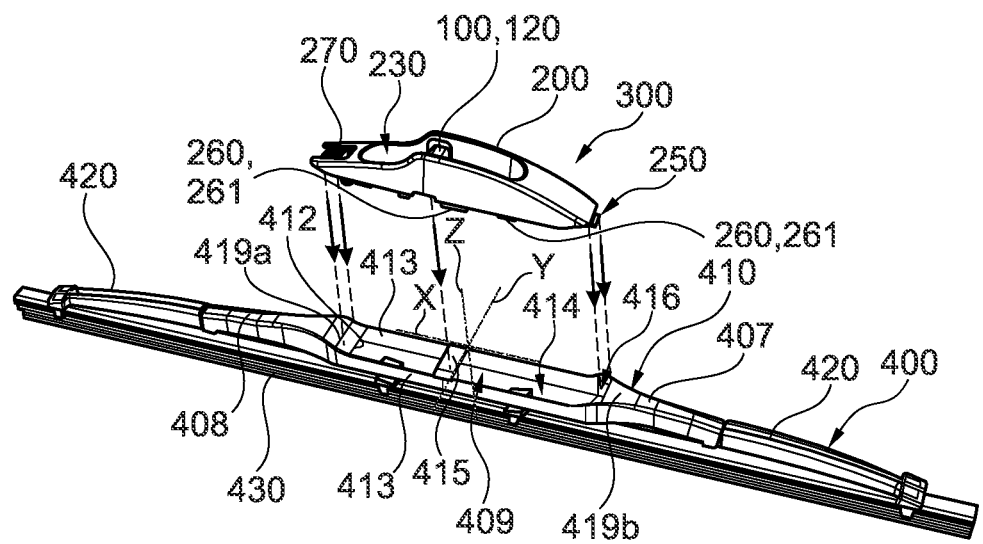
FIGS. 8A and 8B show perspective views of a second exemplary embodiment of a wiper blade according to the second aspect of the invention, respectively disassembled and assembled, the wiper blade being obtained by the association of the adapter shown in FIGS. 6A and 6B with a wiper blade mount.
Figure 8B:
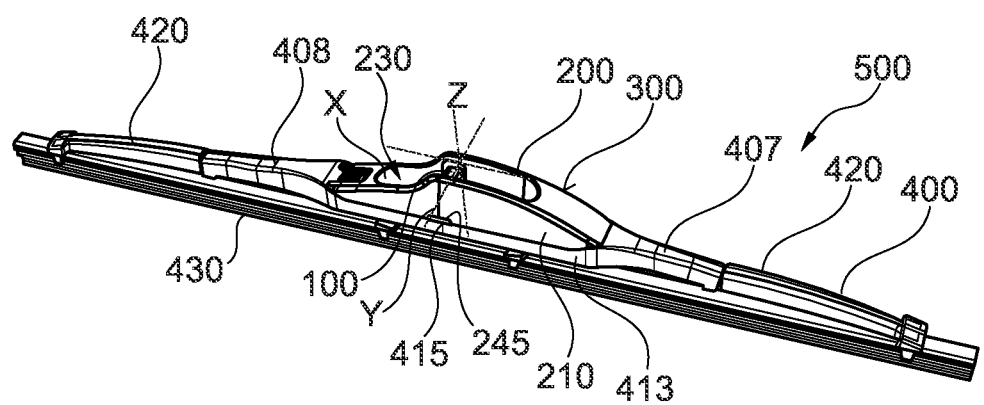

Referring to FIGS. 7 and 8, two exemplary embodiments of a wiper blade 500 according to the second aspect of the invention will now be described. More particularly, FIGS. 7A and 7B show partial views of the wiper blade 500, in which only the adapter 300 and the main cross-bar 410 are shown in order to better highlight their interaction. FIGS. 8A and 8B show views of a wiper blade 500 according to the second aspect of the invention.

Such a wiper blade 500 according to the second aspect of the invention comprises an adapter 300 according to the first aspect of the invention and as described previously in one or other of its alternative embodiments, and a mount 400 including:
  a main cross-bar 410 to which the adapter 300 is removably fastened;
  two secondary cross-bars 420 rigidly connected to the main cross-bar 410 and supporting a wiper rubber 430 suitable for wiping a glazed panel of a motor vehicle in order to remove the water present on its surface.

The main cross-bar 410 of the windscreen wiper mount 400 takes an elongate form along the longitudinal axis X and a narrower form along the transverse axis Y and the vertical axis Z.

Relative to the longitudinal axis X, the main cross-bar 410 comprises a central zone 409 longitudinally delimited by a front nose 408 and a rear nose 407. The central zone 409 of the main cross-bar 410 is configured to interact with the adapter 300, and more particularly with the cover 200. The front nose 408 and the rear nose 407 are configured to interact with the secondary cross-bars 420 and comprise means for detachably fastening said secondary cross-bars 420 to the main cross-bar 410.

A transverse dimension of the central zone 409 of the main cross-bar 410 is equal to a transverse dimension of the cover 200 of the adapter 300. More particularly, lateral edges 413 of the central zone 409 are advantageously located in the extension of the lateral sides 210 of the cover 200. As can be seen in FIG. 7B, the lateral edges 413 of the central zone 409 are coplanar with the lateral sides 210 of the cover 200.

A longitudinal dimension of the central zone 409 is such that it allows the cover 200 to be inserted between the front nose 408 and the rear nose 407 of the main cross-bar 410. More particularly, when the adapter 300 is mounted on the main cross-bar 410 of the mount 400, the rear end 203 of the cover 200 bears against a rear stop 419b of the main cross-bar 410; and the front end 204 of the cover 200 bears against a front stop 419a of the main cross-bar 410. In this way, the cover 200—and, by extension, the adapter 300—is immobilized longitudinally on the central zone 409 of the main cross-bar 410.

In the example shown in FIGS. 7A and 7B, the central zone 409 is solid and takes the form of a support platform 415 for the cover 200 of the adapter 300. More particularly, the lower flat surface 205 of the cover 200 bears vertically against the support platform 415, thus making it easier to position and retain it on the main cross-bar 410.

In order to improve the temporary, that is to say detachable, mechanical assembly of the adapter 300 on the main cross-bar 410, the first longitudinal locking member 250 of the cover 200 interacts with a first housing 416 located at a first front longitudinal end of the support platform 415. More particularly, when the cover 200 is assembled on the main cross-bar 410, the first longitudinal locking member 250 of the cover 200 is inserted successively in the first housing 416 then under the front nose 408 by a rotational movement, so that the front end 204 of the cover 200 bears against the front stop 419a of the main cross-bar 410. Next, the rear end 203 of the cover 200 is brought up to the rear stop 419b of the main cross-bar 410 in order to longitudinally immobilize said cover 200 between the front 419a and rear 419b stops.

During this assembly operation, the lateral centering members 260 of the cover—which take the form of anchoring hooks in the exemplary embodiment of the cover 200 shown in FIGS. 7A and 7B—are inserted in corresponding openings 418 formed on the support platform 415 of the main cross-bar 410, in order to prevent the cover 200 from being pulled off the main cross-bar 410.

In order to improve the assembly of the removable attachment system 100 of the adapter 300 on the main cross-bar 410 of the wiper blade 500 mount 400, the securing device 145 of the adapter 300 interacts with corresponding openings 417 formed on the support platform 415 of the main cross-bar 410 and forming a complementary device allowing said securing device 145 to couple with said corresponding openings 417 by engagement of complementary shapes, in this case by snap-fastening.

In the example shown in FIGS. 8A and 8B, the central zone 409 is hollow and forms a central recess 414 delimited laterally by the lateral edges 413 of the main cross-bar 410. The main cross-bar 410 includes a platform 415 which extends laterally between the two lateral edges 413. In this exemplary embodiment, when the adapter 300 is mounted on the mount 400 of the wiper blade 500, the lower flat surface 205 of the cover 200 bears vertically against an upper end of the lateral edges 413.

In order to guarantee retention of the cover 200 on the main cross-bar 410, the lateral centering members 260 of the cover 200—in this case taking the form of the prismatic protrusions 261 located in the extension of the lateral sides 210 of the cover 200—interact with the lateral edges 413 of the main cross-bar 410. More particularly, when the cover 200 is mounted on the main cross-bar 410, the prismatic protrusions 261 of the cover are located in the central recess 414 in the cross-bar and—simultaneously—against the lateral edges 413 of the main cross-bar 410 located directly opposite. In other words, the prismatic protrusions 261 are located inside and against the lateral edges 413 of the main cross-bar 410. As the cover 200 comprises such prismatic protrusions 261 on each of its lateral sides 210, then the lateral centering members 260 and the lateral edges 413 of the main cross-bar 410 together allow said cover 200 to be centered laterally with respect to said main cross-bar 410.

When the cover 200 is assembled on the main cross-bar 410, the support platform 415 is located in line with the removable attachment system 100 of the adapter 300. More particularly, when the cover 200 is assembled on the main cross-bar 410, the support platform 415 is located in line with the mounting member 120 of the adapter 300. More particularly still, when the cover 200 is assembled on the main cross-bar 410, the support platform 415 is located in line with—and directly below—the lateral flanks 140 of the mounting member 120, so that the terminal end 141 of the lateral flanks 140 bears vertically against the support platform 415 of the main cross-bar 410. This advantageous configuration allows the mounting member 120 to be immobilized vertically, between the rim 241 of the grooves 240 of the cover and the support platform 415 of the main cross-bar 410.

In this assembled configuration, visible more specifically in FIG. 8B, the notch 245 formed on the lateral sides 210 of the cover 200, at its lower edge 201, straddles the support platform 415 of the main cross-bar 410. This advantageous configuration makes it possible in particular to provide a single direction of assembly, the support platform 415 and the notch 245 together forming an error prevention device for the assembly of the adapter 300 on the main cross-bar 410 of the wiper blade 500 mount 400.

In order to improve the temporary, that is to say detachable, mechanical assembly of the adapter 300 on the main cross-bar 410, the first longitudinal locking member 250 of the cover 200 interacts with a first housing 416 located at a first rear longitudinal end of the support platform 415, and the second longitudinal locking member 270 of the cover 200 interacts with a second housing 412 located at a second front longitudinal end of the support platform 415. More particularly, when the cover 200 is assembled on the main cross-bar 410, the first longitudinal locking member 250 of the cover 200 is inserted successively in the first housing 416 then under the rear nose 407 by a rotational movement, so that the rear end 203 of the cover 200 bears against the rear stop 419b of the main cross-bar 410. Next, the front end 204 of the cover 200 is brought up to the front stop 419a of the main cross-bar 410 in order to longitudinally immobilize said cover 200 between the front 419a and rear 419b stops. During this rotational movement, the second locking member 270 interacts by snap-fastening with the second housing 412 in the main cross-bar 410.

In summary, the invention relates in particular to an adapter 300 for a wiper blade mount 400, the adapter 300 comprising a cover 200 configured to accommodate, inside a central opening 230, a removable attachment system 100 which allows subsequent temporary fastening of said adapter 300 to an articulated wiper blade arm, when said adapter 300 is implemented on a wiper blade 500. To this end, the removable attachment system 100 comprises one or more mounting members 120 which take the form of U-clips configured to be removably inserted in the central opening 230 and held in this configuration by means of temporary fastening means 110. The invention also relates to a wiper blade comprising such an adapter 300 mounted on a wiper blade 500 mount 400.

Of course, the invention is not limited to the examples that have just been described, and numerous modifications may be made to these examples without departing from the scope of the invention. In particular, the various features, forms, alternatives and embodiments of the invention may be combined with one another, in various combinations, as long as they are not mutually incompatible or mutually exclusive. In particular, all of the alternatives and embodiments described above can be combined with one another.

The invention claimed is:

1. A wiper blade for a motor vehicle comprising:
a wiper blade mount comprising a main cross-bar and two secondary cross-bars, said secondary cross-bars being fastened to the main cross-bar and supporting a wiper rubber,
the main cross-bar comprising a central recess delimited laterally by two lateral edges, the central recess in the main cross-bar being located in line with the central opening in the cover, and
a platform which extends transversely through the central recess and between the two lateral edges; and
an adapter for fastening a wiper blade mount on an articulated wiper blade arm, the adapter being removably fastened to the main cross-bar and comprising:
a cover configured to be removably fastened to the main cross-bar of the wiper blade mount, the cover comprising a central opening delimited laterally by two lateral sides;
a removable attachment system for removably attaching the articulated wiper blade arm to the adapter, the platform being located in line with said removable attachment system such that the removable attachment system bears against the platform, the removable attachment system comprising at least one mounting member comprising a pivot connection rod extending transversely through the central opening between the two lateral sides of the cover, the pivot connection rod being delimited laterally by two lateral flanks;
the removable attachment system comprising temporary fastening means for temporarily fastening said removable attachment system to the cover, each mounting member comprising the temporary fastening means for temporary fastening to the cover;
wherein at least one of the lateral sides of the cover comprises a groove formed on one face of the lateral side or sides located on the side of the central opening, the groove or grooves extending from a lower edge toward an upper edge;
the groove or grooves being formed on the lateral side or sides of the cover extending from the lower edge of the corresponding lateral face of the cover and toward the upper edge, and blocked at an upper end by a rim.

2. The wiper blade as claimed in claim 1, wherein the two lateral flanks each extend at a lateral end of the pivot connection rod.

3. The wiper blade as claimed in claim 2, wherein in a plane perpendicular to the pivot connection rod of each mounting member, the lateral flanks extend beyond a cylindrical surface of the pivot connection rod, such that a terminal end of the lateral flank or flanks is at a non-zero distance from the pivot connection rod.

4. The wiper blade as claimed in claim 2, wherein the temporary fastening means of each mounting member are configured to allow assembly by engagement of complementary shapes between at least one of the lateral flanks of the mounting member and the lateral sides of the cover.

5. The wiper blade as claimed in claim 1, wherein at least one of the lateral sides of the cover comprises, on a lower edge intended to bear against the main cross-bar, a notch intended to allow the insertion of a support platform of the main cross-bar.

6. The wiper blade as claimed in claim 1, wherein at least one of the mounting members includes a device for securing to the main cross-bar of the wiper blade mount.

7. The wiper blade as claimed in claim 6, wherein the cover comprises a first longitudinal locking member for locking the cover on the main cross-bar of the wiper blade mount, the first longitudinal locking member being configured to place the cover in longitudinal abutment against the main cross-bar.

8. The wiper blade as claimed in claim 7, wherein the cover comprises a second longitudinal locking member for locking the cover on the main cross-bar of the wiper blade mount.

9. The wiper blade as claimed in claim 8, wherein the cover comprises a lateral centering member for centering said cover relative to the main cross-bar of the wiper blade mount, the lateral centering member being configured to laterally center the cover on the main cross-bar.

10. The wiper blade as claimed in claim 1, wherein at least one of the lateral sides of the cover comprises, on a lower edge intended to bear against the main cross-bar, a notch intended to allow the insertion of a support platform of the main cross-bar, the platform of the main cross-bar being configured to engage in the notch formed in the lateral sides of the cover.

11. The wiper blade as claimed in claim 1, wherein the cover comprises a first longitudinal locking member for locking the cover on the main cross-bar of the wiper blade mount, the first longitudinal locking member being configured to place the cover in longitudinal abutment against the main cross-bar, the main cross-bar further comprising, at a first longitudinal end of the central recess, a first housing configured to interact with the first longitudinal locking member of the cover.

12. The wiper blade as claimed in claim 1, wherein the cover comprises:
a first longitudinal locking member for locking the cover on the main cross-bar of the wiper blade mount, the first longitudinal locking member being configured to place the cover in longitudinal abutment against the main cross-bar, and
a second longitudinal locking member for locking the cover on the main cross-bar of the wiper blade mount, the main cross-bar further comprising, at a second longitudinal end of the central recess opposite the first end, a second housing configured to interact with the second longitudinal locking member of the cover.

* * * * *